June 16, 1942. D. SILVERMAN 2,286,386

SEISMOMETER

Filed Dec. 7, 1939

INVENTOR
Daniel Silverman
BY
Geo L. Parkhurst
ATTORNEY

Patented June 16, 1942

2,286,386

UNITED STATES PATENT OFFICE 2,286,386

SEISMOMETER

Daniel Silverman, Tulsa, Okla., assignor to Stanolind Oil and Gas Company, Tulsa, Okla., a corporation of Delaware Application December 7, 1939, Serial No. 308,099

15 Claims. (Cl. 177—352)

This invention pertains to the art of seismic geophysical prospecting and more particularly to a new and especially advantageous type of seismometer for use in such prospecting.

Seismometers of various types have long been known. However the portable types of small and rugged instruments which are used for geophysical prospecting have been a matter of more recent development.

There are two types which have been evolved and which are now in general use, the so-called "reluctance" and "dynamic" types. Both of these are electromechanical transducers, changing motion of the earth into corresponding electric signals by altering in some manner the magnetic flux threading one or more coils. In the reluctance type seismometer the reluctance of the magnetic circuit threading the coil is varied in accordance with the ground motion, whereas in the dynamic type of instrument the reluctance of the mechanical circuit is constant and the coil or coils themselves are moved by the ground motion. The instrument which I have invented belongs to the dynamic type of equipment.

In the early type of dynamic field seismometer a mass suspended yieldably by a spring or springs from a case, was attached to the coil which was positioned normally in a radial magnetic field in a manner resembling the conventional assemblage of voice coil and magnet assembly in a dynamic type loud speaker.

Motion of the ground due to the detonation of dynamite in the conventional seismic prospecting methods would move the case of the seismometer but due to its elastic suspension the sprung mass would remain relatively stationary and hence there would be motion of the coil in the magnetic field.

As one of the chief considerations in the design of seismometers is to obtain maximum output from a given weight of instrument, the simple type of dynamic instrument described above was soon abandoned in view of a type having mechanical amplification built into the instrument. This constituted a distinct improvement and raised the sensitivity of the instrument to the neighborhood of that of the reluctance type which had previously been the more sensitive of the two.

The dynamic seismometer possesses inherent advantages over the reluctance type. It is impossible to "stick" the moving elements to one of the stationary pole pieces, also the instrument can be more highly damped than can the reluctance type. Accordingly it has come more and more into favor. However, since mechanical magnification of some sort was necessary, it was essential to use an auxiliary sprung mass connected by a lever or some other mechanical magnifying means, to the coil. Accordingly, there was always present an extra weight in the seismometer which it would be advantageous to eliminate in order to obtain an instrument as light as possible. For a given mass of coil and bobbin the amount of auxiliary mass required to drive the moving system increases roughly as the square of the magnification. Thus it is seen that for any appreciable mechanical magnification the weight of the auxiliary mass can easily exceed the weight of the other elements in the seismometer. Attempts have been made to use the magnet assembly itself for the auxiliary mass but experiments along this line have shown that this results in complication of construction, fragility of the total seismometer and the production of spurious frequency components in the output which must, of course, be eliminated.

It is an object of this invention to provide a new type of dynamic seismometer in which the auxiliary mass is eliminated.

Another disadvantage of the normal dynamic seismometer lies in the fact that it is responsive to rotational as well as translational waves. It has been found by experience that for normal prospecting, a seismometer should respond solely to vertical motion, as much of the rotational energy is due to ground roll, wind disturbance, etc. Although it is possible to use filter systems which will eliminate some of these disturbing waves, this procedure is much more disadvantageous than the use of a seismometer which is inherently insensitive to rotational motion. Accordingly, it is an important object of my invention to provide a seismometer which is responsive only to translational and not to rotational motion.

It is a further object of my invention to provide means in such a seismometer whereby the output for the same amount of mechanical magnification can be more than doubled for a weight of parts approximately equal to that of the normal dynamic seismometer, exclusive of the case.

Another object of my invention is to provide a seismometer, the frequency response of which resembles that of a band-pass filter rather than the resonant type filter response which characterizes the response of present types of dynamic seismometer.

Further advantages of this invention will become apparent upon perusal of the following description of the instrument.

For purposes of simplicity, I am describing one embodiment of my invention in the form of a dynamic seismometer which has proved to be highly advantageous and which accomplishes the above named objects. This embodiment is illustrated in the accompanying drawing which forms a part of this specification and which is to be read in connection therewith. It is understood, however, that many modifications of my invention not shown or described in this particular embodiment can be made within the spirit of the invention.

In the drawing Figure 1 shows a diagrammatic plan view of a seismometer built in accordance with my invention, shown with the cover removed.

Figure 1:
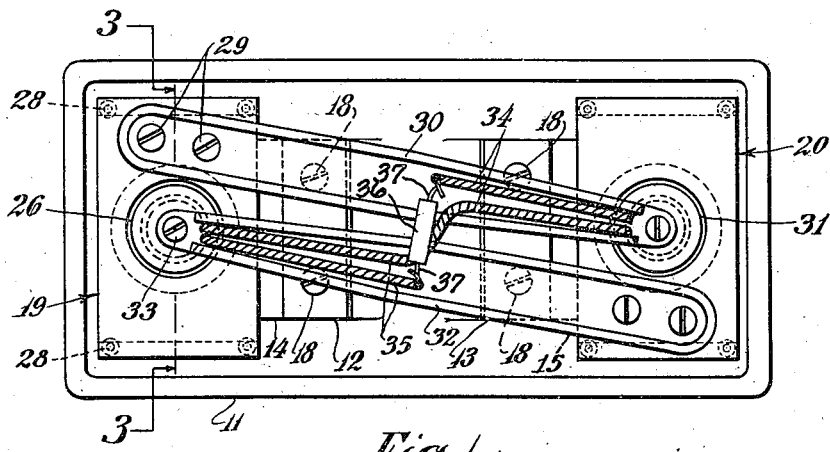

Referring now to the drawing in more detail, the case 11 is cast integral with two buttresses 12 and 13. To these buttresses are firmly attached flat leaf springs 14 and 15, by means of caps 16 and 17 which are held in place by machine screws 18 tapped into the buttresses 12 and 13. The springs 14 and 15 support magnet assemblies 19 and 20, respectively. Magnet assembly 19 is composed of a ferro-magnetic central cylindrical member 21 (shown in Figure 3), magnet 22 and ferro-magnetic base plate 23 which is attached to member 21 by ferro-magnetic screw 24. The magnet 22 (which may be made of Alnico or the like) and cylindrical center post 21 are assembled so as to form an annular air gap 25 in which the coil 26 is positioned. As the top of the magnet 22 forms one pole and the bottom forms the opposite pole it is seen that by this assembly there is a radial magnetic field in the air gap 25 so that vertical motion of the coil 26 will cause the coil conductors to cut the magnetic field and hence generate voltage. Coil 26 is composed of a bobbin and support on which the actual conductors 26a are wound.

Magnet assembly 19 has a centrally apertured cover plate 27 held in place by screws 28. This cover plate holds magnet 22 in place without the necessity of drilling the very hard material of which it is normally made. Secured to the top of cover plate 27 of magnet assembly 19 by cap screws 29 is a light rigid arm 30 which carries at its opposite extremity a coil 31 wound on a bobbin. A similar arm 32 carrying a similar coil and bobbin assembly 26 is fastened to magnet assembly 20 by screw 33. The arms 30 and 32 are arranged carefully so that coil and bobbin assemblies 26 and 31 will be positioned in the annular air gaps of magnet assemblies 19 and 20 respectively without allowing the coils to scrape against the walls defining the air gaps at any time.

The opposite ends of the coil 31 are brought out and attached to leads 34. Similarly the opposite ends of the coil 26 are brought out to leads 35. Two of these leads are inter-connected so that the voltage of both coils, due to vertical motion of the seismometer, is additive. Thus only two leads need to be brought out from the seismometer. These are connected to a terminal box mounted on the seismometer, to the opposite sides of an electric plug, or to some other arrangement for connecting them to the input of the amplifying system used in the conventional recording truck. Since this arrangement is entirely optional, the arrangement for connecting is not shown, nor further described.

Figure 2:
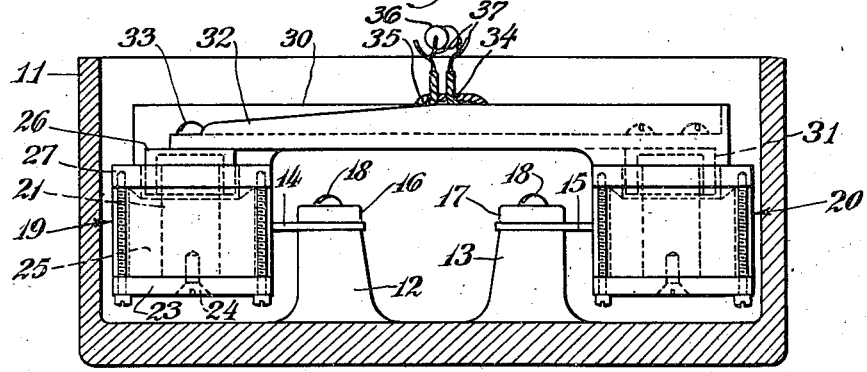
Figure 2 is a diagrammatic elevation of the same instrument shown in Figure 1 with one side broken away for clarity in illustration.

It can be seen from an inspection of Figures 1 and 2 that if magnet assembly 19 were fixed and immovable with respect to the case, an upward motion of the case 11 would apply inertia forces to assembly 20 which would drive it downwardly in an arcuate path relative to the case. Assembly 20 is therefore referred to as an inertia member. The relative motion between the case and assembly 20 is amplified and changed into an upward motion at the left extremity of arm 32, raising the coil assembly 26 relative to magnet assembly 19 and generating voltage in this coil.

Thus far the action of the seismometer as described would be no different than in one conventional variety of instrument and the voltage output would be no more than could be obtained with that size and weight of seismometer. However, in normal operation magnet assembly or inertia member 19 is free to move in exactly the same manner as assembly 20. Accordingly, since assembly 19 is driven downward in an arcuate path by the upward motion of the case, there will be an increase in the relative motion between the coil and bobbin assembly 26 and the magnet assembly 19, resulting in a greater voltage across leads 35. As the instrument is symmetrical with respect to the moving elements the same results will be obtained across leads 34.

It follows that the output from the series connection of the two coils will be more than double that of a conventional dynamic seismometer in which one of the coil and magnetic assemblies would normally be replaced by an auxiliary dead weight. I have, accordingly, accomplished one major purpose of the invention.

If the seismometer be subjected to rotational motion about a horizontal axis normal to the long dimension of the instrument, one of the magnet assemblies will experience an upward, and the other a downward force. The two coils will move in opposite directions, the voltages generated in the coils will be equal and opposite, and the output will be nil. Rotational motion about either of the other two mutually perpendicular rotational axes will also yield no output as the springs constrain the magnet assemblies against motion except in the one direction. Accordingly, the seismometer does not respond to rotational motion, thus accomplishing this very important object of the invention.

While the specific embodiment shown is a particularly advantageous form of seismometer responsive only to translational forces in one plane and not responsive to rotational forces it will be apparent in the light of my teachings that this can be accomplished without using the magnet assemblies as inertia members so long as we provide two coils mounted to move in two magnetic fields with one and the same degree of freedom and interconnect the outputs so that motion of the two coils in the same direction will give additive effects and motion in opposite directions will give subtractive effects. The device can suitably be symmetrical so that the coil outputs will be equal. In the sense used here symmetrical defines an arrangement of parts about a single line parallel to the direction of maximum seismometer sensitivity in such a way that when a number of planes radiate from this line forming the same number of equal dihedral angles as there are mechanically oscillating systems, the same number, shape, and general arrangement of parts of the oscillating systems are included in each such angle.

It is possible to damp the moving systems electro-magnetically by shunting a fixed resistance 36 across the output terminals 37. The degree of damping will be determined by the magnitude of the fixed resistor in relation to the electrical and mechanical properties of the seismometer and can be fixed at any point desired.

In use, the usual type of field seismometer is operated "under damped" so that the output from the instrument is greatest at one frequency and decreases rapidly for ground motions of either higher or lower frequency. It is by now well known that it is desirable in seismic prospecting to limit the recorded frequencies to a given range and to discriminate against frequencies above and below this range which normally lies between 25 and 80 cycles, approximately. Lower frequency disturbances such as ground roll etc. and high frequency disturbances as wind disturbances, are partially eliminated by the use of an under-damped seismometer, the resonant frequency of which is designed to be somewhere in the desired band of frequencies. However, it is quite often desirable to have approximately equal sensitivity over the desired range of frequencies, which can not be produced by the use of a single tuned mechanical circuit such as an under-damped seismometer.

The frequency-response curve of such an instrument resembles in general that of a resonant type filter. Quite elaborate amplification systems have been devised including various filters in order to secure characteristics more nearly approaching a band-pass filter. In the instrument described herein, it is possible to facilitate the obtaining of a band-pass characteristic by tuning each of the two mechanically oscillating systems to a different frequency. The results of this process can be illustrated by Figure 4.

Figures 3, 4:
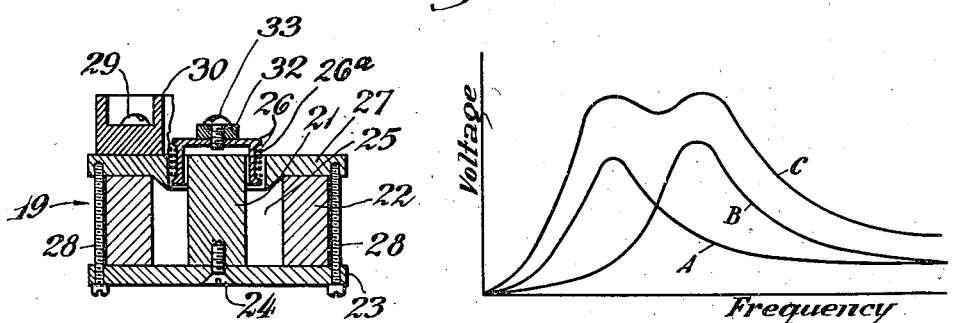
Figure 3 is a cross section of part of the magnet assembly shown in Figures 1 and 2, taken along the line 3—3 of Figure 1.
Figure 4 illustrates the frequency-response curve of the present conventional type of dynamic seismometer and the response of one type of seismometer built in accordance with my invention.

In Figure 4, curve A represents the voltage output-frequency characteristic which would be obtained from this seismometer actuated by a constant amplitude wave at various frequencies, if one of the two mechanically oscillating circuits were clamped to the case. Curve B represents the voltage output for constant amplitude waves of varying frequencies if the other mechanically oscillating circuit was clamped. As discussed above, the two resonant frequencies are shifted, one on either side of the middle of the frequency band to be received. In this case the output of the seismometer with neither system clamped (normal operation) will be approximately that shown in curve C. This curve has a flatter top than either curve A or B which are examples of the type curves which would be obtained by the single dynamic seismometer known to the art. Of course, if it is desirable to use the type of curve represented by A or B this can be obtained simply by tuning both mechanically oscillating systems to the same frequency.

It is obvious that numerous modifications and variations in the design of seismometers can be made, utilizing the principles of my invention. For example, any desired number of mechanically oscillating systems can be placed together in mutual relationship in the same manner as the two shown in Figures 1 and 2 were placed. Also, although this specification has shown and described only a vertical type seismometer, horizontal instruments can be designed with equal facility.

I claim:

1. A seismometer comprising a case, two coils, two magnets, one of said coils being disposed in the field of one of said magnets and the other of said coils in the field of the other of said magnets, an elastic suspension constructed and arranged to restrain relative motion between one of said coils and its associated magnet except in a single degree of freedom, a second and independent elastic suspension constructed and arranged to restrain relative motion between the other of said coils and its associated magnet except in a corresponding single degree of freedom such that small relative motions between each of said coils and its associated magnet are at least approximately parallel to the same straight line and means for electrically interconnecting said coils to combine their outputs when relative motions between the two coils and their respective associated magnets are in the same sense and to oppose their outputs when relative motions between said coils and their respective associated magnets are in opposite senses, whereby said seismometer is responsive only to forces having a translational component in the direction of said straight line and is not responsive to rotational forces.

2. A seismometer comprising a case, two coils, supporting means associated with said case and with said coils, said supporting means comprising an elastic suspension for mounting one of said coils with a single degree of freedom and a second and independent elastic suspension for mounting the other of said coils with a corresponding single degree of freedom such that small relative motions between each of said coils and its associated magnet are at least approximately parallel to the same straight line, means for subjecting said coils to magnetic fields of force and means for electrically interconnecting said coils to combine their outputs when said coils move in the same direction relative to said case and to oppose their outputs when said coils move in opposite directions relative to said case, whereby said seismometer is responsive only to translational forces in the direction of said straight line and is not responsive to rotational forces.

3. In a seismometer of the dynamic type, a frame, a plurality of magnets mounted as inertia members from said frame and a plurality of coils, each of said coils being rigidly connected to only one of said magnets and electromagnetically associated only with another of said magnets.

4. In a seismometer of the dynamic type, a case, a first and a second magnet independently mounted from said case as inertia members, a first coil rigidly connected to the first magnet only and electromagnetically associated only with the second magnet and a second coil rigidly connected to the second magnet only and electromagnetically associated with the first magnet.

5. In a seismometer, a common vibration-receiving member, a plurality of masses resiliently mounted upon said common vibration-receiving member, each of said masses comprising a magnet, a coil disposed in the field of each of said magnets and means mechanically associated with each of said coils for moving said coil in response to the motion of only one of said inertia members relative to said seismometer as a whole, said inertia member being an inertia member other than the inertia member comprising the magnet in the field of which said coil is disposed.

6. A seismometer including a base, two inertia members resiliently coupled to said base, each of said inertia members comprising a magnet, a coil disposed in the field of each of said magnets and means for moving each of said coils in response to the movement, relative to said seismometer as a whole, of the inertia member other than that including the magnet in the field of which said coil is disposed.

7. A seismometer comprising a case, a plurality of magnets, a plurality of elastic supports, one of said elastic supports being associated with each of said magnets, said elastic supports also being associated with said case for supporting said magnets as inertia members, a coil electromagnetically associated with one of said magnets, means associated with said coil and with a second of said magnets for moving said coil in response to movements of said second magnet relative to said case, a second coil electromagnetically associated with said second magnet and means associated with said second coil and with one of said magnets other than said second magnet for moving said coil in response to the movement of said last-mentioned magnet relative to said case.

8. A seismometer comprising a case, two magnets disposed in said case, elastic supports associated with each of said magnets and with said case whereby each of said magnets is mounted within said case as an inertia member, each of said magnets having a gap, a coil disposed in the gap of each of said magnets and means mechanically connecting each of said coils only with the magnet other than that in the gap of which it is disposed, said means being so constructed and arranged that each of said coils is rendered responsive to the motion relative to said case, of one of said magnets other than that in the gap of which it is disposed.

9. A seismometer comprising a case, two magnets, means comprising elastic members for mounting said magnets independently as inertia members within said case, a coil for each of said magnets disposed in a gap thereof and means rgidly connecting each of said coils with only that magnet which is other than that in the gap of which it is disposed.

10. A seismometer comprising a base equipped with two supports, a leaf spring carried by each of said supports and a magnet carried by each of said leaf springs whereby each of said magnets is mounted as an inertia member and is subjected to rotary motion relative to said case when said case is subjected to reciprocal motion in a direction normal to the plane of said spring, a long arm carried by each of said magnets and extending in the direction of said spring whereby when said magnet is subjected to a generally downward rotational movement relative to said case the end of said arm opposite said magnet is subjected to a generally upward movement, and a coil carried by the end of each of said arms opposite the end affixed to said magnet, each of said coils being electromagnetically associated with the magnet other than that with which it is associated by means of said arm.

11. A seismometer including a frame, two supports rigidly connected to said frame, two leaf springs, one associated with each of said supports, extending in opposite directions from said supports, two magnets, one associated with each of said leaf springs, carried by the ends of said leaf springs opposite the ends of those springs associated with said supports, two coils, one electromagnetically associated with each of said magnets, and two elongated members, one associated with each of said coils and mechanically connecting said coil with the magnet other than the magnet with which said coil is electromagnetically associated.

12. A seismometer according to claim 11 in which the outputs of said two coils are coupled in an additive manner.

13. A claim according to claim 11 in which said magnet assemblies and their associated springs are tuned to respond selectively to different mechanical frequencies.

14. A seismometer comprising a case including two supports in spaced relationship, two leaf springs, one associated with one of said supports and the other associated with the other of said supports, said leaf springs extending outwardly from said supports in opposite directions, two magnets each having an annular cylindrical gap, one of said magnets being carried by one of said leaf springs and the other of said magnets being carried by the other of said leaf springs, said magnets thus being disposed on opposite sides of said supports, two motion amplifying arms, one affixed at one end to one of said magnets and the other affixed at one end to the other of said magnets, said arms extending inwardly in the direction of said supports and two coils, one carried by one of said arms at the end opposite the aforementioned affixed end and the other carried by the other of said arms at the end opposite the aforementioned affixed end, one of said coils being disposed in one of said gaps and the other being disposed in the other of said gaps.

15. A seismometer of the dynamic type comprising a case, at least two supports in said case, an equal number of magnets elastically supported from said supports and defining cylindrical air gaps, an equal number of arms each attached at one extremity to one of said magnets, and a coil carried at the opposite extremity of each of said arms, said coil fitting in but not touching the walls of one of said air gaps in one of said magnets.

DANIEL SILVERMAN.